United States Patent Office 2,905,714
Patented Sept. 22, 1959

2,905,714

RECRYSTALLIZATION OF TETRACYCLINE

Harold Mendelsohn, Nanuet, N.Y., assignor to American Cyanamid Company, New York, N.Y., a corporation of Maine No Drawing. Application October 1, 1956
Serial No. 612,961

8 Claims. (Cl. 260—559)

This invention relates to the purification of tetracycline and more particularly is concerned with a novel process of recrystallization of crude neutral tetracycline whereby high yields of high quality neutral tetracycline crystals are produced.

Considerable difficulty has been experienced in developing commercially practicable refining processes for the purification of tetracycline from the fermentation mash. It might be supposed because of the structural similarities between chlortetracycline and tetracycline that the purification procedures that were satisfactory for the refining of chlortetracycline would also be satisfactory for the refining of tetracycline. Contrary to expectations, however, this has not always proven to be the case. When tetracycline is recovered by one of the best procedures developed for the recovery of chlortetracycline, i.e. the procedure described in the Pidacks et al., Patent No. 2,655,-535, which involves the extraction of chlortetracycline from the fermentation mash with normal butanol at a pH of about 1.3 followed by concentration of the butanol extract and recovery of the chlortetracycline therefrom as an acid salt, it has been found that very low recoveries, of the order of 20%, of very poor products are obtained. Apparently, this is because in recovering tetracyline from the acidic butanol extract, there is much degradation of the tetracycline and formation of highly colored impurities which are recovered along with the tetracycline. Consequently, the Pidacks et al., process cannot be used on a commercial scale for the refining of tetracycline.

In the application of Mendelsohn et al., Serial Number 518,961, filed June 29, 1955, now abandoned, there is described and claimed a process of obtaining tetracycline from the fermentation mash. Briefly, this process involves contacting an organic solvent extract, i.e. normal butanol, of tetracycline with acidulated water at a pH of from 1.5–2.5. The two phases are mixed and separated and the acid salt of tetracycline passes into the aqueous phase. This acid water extract is then neutralized by the addition of base to a pH of from 4–8 whereupon crude tetracycline neutral crystallizes from the solution.

The present invention is concerned with an improved process of converting crude neutral tetracycline, produced as described in my aforesaid application for example, to high quality neutral crystals. Essentially my improved process involves dissolving crude tetracycline in a mixture of water and a chlorine substituted alcohol such as ethylene chlorohydrin. Solution of the tetracycline is effected by adjusting the pH to between about 1.3 and 2.5 and preferably at a pH of about 2.0. The insoluble impurities are then filtered off and the pH of the filtrate is adjusted to 5–6 with alkali whereby high quality neutral tetracycline crystals are obtained.

For some reason, which is not understood, the chlorine substituted alcohols of this invention are remarkably good recrystallizing solvents when mixed with water and used under the acid conditions employed herein so that a highly purified product in excellent yield is obtained from crude starting material.

Among the suitable chlorine substituted alcohols that are useful in carrying out the process of this invention there may be mentioned ethylene chlorohydrin, propylene chlorohydrin, 1,2-dichloro-3-propanol, etc. There may also be used with equal facility, chlorine substituted alcohols which may be interrupted with ether linkages between the chlorine atom and the hydroxy group such as, for example, diglycol chlorohydrin, polyethylene glycol chloride, etc. It is to be understood that all such suitable recrystallizing solvents for use in the present invention are embraced within the term "chlorine substituted alcohols" as used throughout the specification and claims.

While any convenient alkali such as sodium hydroxide or potassium hydroxide or other alkali metal hydroxides or alkaline earth metal hydroxides may be used in neutralizing the acid solution, it has been found that the use of alkali metal or ammonium sulfites or mixtures thereof produce crystals of excellent color value and improved visual appearance. Hence, the use of these sulfites may desirably be used as neutralizing agents in place of the conventional alkalis and are actually preferred from the standpoint of producing superior products.

The recrystallizing solution is preferably composed of from 35%–70% water, the remaining percentage by volume being a chlorine substituted alcohol and from 12.5% to 75% by weight of sulfite for each part by weight of tetracycline, with the final pH of the solution being adjusted to about 6. A typical recrystallizing solvent solution that produces good yields of products of superior quality is composed of 8 parts of tetracycline in 63.13 parts by volume total solvent mixture having a composition of 70% water and 30% propylene chlorohydrin with 5 parts by weight of sodium sulfite. The yield of neutral tetracycline with such a recrystallizing solution is 93.6%. Assay 1068 γ/mg.;

$$E_{450}^{1\%} \, m\mu = 0.508$$

The invention will be described in greater detail in conjunction with the following specific examples.

*Example 1*

(Following the procedure at the Mendelsohn et al. application Serial No. 518,961.)

Two liters of tetracycline mash assaying 3970 gammas per milliliter was treated with 10 grams of magnesium trisilicate (Magnesol), 120 grams of a filter aid (Hyflo) and adjusted to pH 7.6 with sodium hydroxide. The mixture was stirred 30 minutes and filtered. The cake was slurried in 600 milliliters of butanol and adjusted to a pH of 1.42 with 18 milliliters of concentrated hydrochloric acid. After stirring 40 minutes, the slurry was filtered. The cake was reslurried with 600 milliliters of butanol and 30 milliliters of water, adjusted to pH 1.47 with 2 milliliters of hydrochloric acid, stirred 40 minutes and filtered. The cake was slurried in 600 milliliters of water, and adjusted to pH 1.38 by the addition of 1 milliliter of hydrochloric acid. The mixture was stirred for 40 minutes and filtered. The cake was washed with 250 milliliters of butanol.

The three butanol extracts and the butanol wash were combined, treated with 2 grams of decolorizing charcoal (Darco G-60) and 10 grams of sodium chloride, stirred for 15 minutes, and filtered with the use of a filter aid (Hyflo). The filtered solution was allowed to stand at 4° C. and separated to remove the brine phase. The clarified butanol extract was adjusted to pH 1.85 with 18 normal sodium hydroxide and concentrated in vacuo at 20–24° C. to approximately 110 milliliters. The concentrate was extracted 4 times with 110 milliliters of water, using concentrated hydrochloric acid to maintain a pH of 1.8–2.0. The combined water extract was washed twice with 22 milliliters of chloroform.

The washed aqueous extract was concentrated in vacuo to 120 milliliters. To the concentrate 2.5 milliliters of butanol and 3 grams of 80 percent ethylenediaminetetraacetic acid tetrasodium salt (Versene) were added, and the pH adjusted to 6.2 with 18 normal sodium hydroxide. The solution was stirred overnight, and the crystals were filtered, washed twice with 6 milliliters of water saturated with butanol and dried in vacuo. A yield of 5.77 grams was obtained.

Example 2

Crude tetracycline neutral (3.41 grams) obtained by the procedure described in Example 1, and assaying 880 grammas per milligram and having an E value of 5.20, was slurried in 15 milliliters of 3:1 (vol./vol.) mixture of propylene chlorohydrin and water. The slurry was stirred and solution of the tetracycline was effected by the addition of 12 N HCl until the pH was 2.0. The solution was filtered. The filtrate was diluted with water (22.0 milliliters). The pH was adjusted to 6.0 (stirring) with 1.0 gram of $Na_2SO_3$ and 0.3 milliliter of 18 N NaOH. After aging (stirring) for 5 hours, the agitation was stopped. The reaction mixture was stored at 4° C. overnight. The crystals were filtered, washed with small amounts of fresh solvent mixture and water. The product was dried in vacuo at 40° C. The yield was 2.45 grams (84%). The product assayed 1022 gammas/mg.;

$$E_{450}^{1\%}\ m\mu = 0.472$$

Example 3

Crude tetracycline neutral (5.00 grams) obtained as described in Example 1 and assaying 795 $\gamma$/mg. was suspended in 30 milliliters of mixed solvents having a composition of 20 milliliters of diglycol chlorohydrin and 10 milliliters of water. Using agitation, solution was effected by the addition of 1.0 milliliter of aqueous hydrochloric acid (37%). The pH reading of the solution at this point was 2.0. The solution was filtered. The filtrate was diluted with 45 milliliters of water. The pH was raised to 6.0 by the addition of sodium sulfite (1.75 grams). After stirring for 1½ hours, the crystalline product was filtered, washed with small amounts of solvent mixture and water; and dried in vacuo at 40° C. The yield of recrystallized product was 2.34 grams. Assay 1058 $\gamma$/mg.;

$$E_{450}^{1\%}\ m\mu = 0.600$$

Example 4

Crude tetracycline neutral (5.00 grams) obtained as described in Example 1 and assaying 795 $\gamma$/mg. was suspended in 30 milliliters of mixed solvents having a composition of 20 milliliters polyethylene glycol chloride and 10 milliliters of water. Using agitation, solution was effected by the addition of 1.0 milliliter of aqueous hydrochloric acid (37%). The solution was filtered. The filtrate was diluted with 45 milliliters of water. The pH was raised to 6.0 by the addition of sodium sulfite (1.75 grams). After stirring for 1½ hours, the product was filtered, washed with small portions of mixed solvents and water; and then dried in vacuo at 40° C. The yield of recrystallized tetracycline neutral was 2.96 grams. Assay 1042 $\gamma$/mg.;

$$E_{450}^{1\%}\ m\mu = 0.808$$

Example 5

Crude tetracycline neutral (5.00 grams) obtained as described in Example 1 and assaying 795 $\gamma$/mg., was suspended in 30 milliliters of mixed solvents, having a make-up composition of 20 milliliters of ethylene chlorohydrin and 10 milliliters of water. Using agitation, solution was effected by the addition of 1.0 milliliters of aqueous hydrochloric acid (37%). The pH reading at this point was 2.0. The solution was filtered. The filtrate was diluted with 45 milliliters of water. The pH was raised to 6.0 by the addition of sodium sulfite (1.75 grams). After stirring for 1½ hours, the crystalline product was filtered, washed with small amounts of solvent mixture and water; and then dried in vacuo at 40° C. The yield of recrystallized product was 2.25 grams. Assay 1038 $\gamma$/mg.;

$$E_{450}^{1\%}\ m\mu = 0.600$$

Example 6

Crude tetracycline neutral (5.00 grams) obtained as described in Example 1 and assaying 795 $\gamma$/mg., was suspended in 30 milliliters of mixed solvents having a make-up composition of 20 milliliters of 1,2-dichloro-3-propanol and 10 milliliters of water. Using agitation, solution was effected by the addition of 1.0 milliliters of aqueous hydrochloric acid (37%). The pH of the solution was 2.0. The solution was filtered. The filtrate was diluted with 45 milliliters of water. The pH was raised to 6.0 with sodium sulfite (1.75 grams). After stirring for 1½ hours, the crystalline product was filtered, washed with small amounts of mixed solvent and water. The recrystallized tetracycline was dried in vacuo at 40° C. The yield was 2.57 grams assaying 1050 $\gamma$/mg.;

$$E_{450}^{1\%}\ m\mu = 0.585$$

I claim:

1. In the process of purifying tetracycline produced by fermentation, the improvement which comprises recrystallizing tetracycline in a mixture of a chlorine-substituted alcohol and water at a pH of between about 1.3 and 2.5, the chlorine substituted alcohol being selected from the group consisting of ethylene chlorohydrin, propylene chlorohydrin, polyethylene glycol chloride, diglycol chlorohydrin, and 1,2-dichloro-2-propanol and being present in the mixture to the extent of between about 30% and 65% by volume, removing the insoluble impurities by filtration, and thereafter recovering purified tetracycline neutral crystals by adjusting the pH of the solution to between 5–6.

2. The process according to claim 1 in which the chlorine substituted alcohol is ethylene chlorohydrin.

3. The process according to claim 1 in which the chlorine substituted alcohol is propylene chlorohydrin.

4. The process according to claim 1 in which the chlorine substituted alcohol is polyethylene glycol chloride.

5. The process according to claim 1 in which the chlorine substituted alcohol is diglycol chlorohydrin.

6. The process according to claim 1 in which the chlorine substituted alcohol is 1,2-dichloro-3-propanol.

7. The process according to claim 1 in which the pH of the solution is adjusted to between 5–6 by the use of an alkali metal sulfite.

8. The process according to claim 7 in which the sulfite is sodium sulfite.

References Cited in the file of this patent

UNITED STATES PATENTS

| | | |
|---|---|---|
| 2,516,080 | Sobin et al. | July 18, 1950 |
| 2,655,535 | Pidacks et al. | Oct. 13, 1953 |
| 2,658,077 | Harms | Nov. 3, 1953 |
| 2,658,078 | Blase | Nov. 3, 1953 |
| 2,699,054 | Conover | Jan. 11, 1955 |
| 2,734,018 | Minieri et al. | Feb. 7, 1956 |

FOREIGN PATENTS

| | | |
|---|---|---|
| 536,274 | Belgium | Mar. 7, 1955 |
| 690,381 | Great Britain | Apr. 22, 1953 |
| 692,131 | Great Britain | May 27, 1953 |
| 7/1954 | Trinidad | Mar. 26, 1954 |

OTHER REFERENCES

Minieri: Antibiotics Annual (1953–1954), page 83.